(12) United States Patent
Lee

(10) Patent No.: US 11,135,933 B2
(45) Date of Patent: Oct. 5, 2021

(54) ECO-FRIENDLY VEHICLE AND CHARGING CONTROL METHOD THEREFOR

(71) Applicants: HYUNDAI MOTOR COMPANY, Seoul (KR); KIA MOTORS CORPORATION, Seoul (KR)

(72) Inventor: Jea Mun Lee, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 174 days.

(21) Appl. No.: 16/518,599

(22) Filed: Jul. 22, 2019

(65) Prior Publication Data

US 2020/0171970 A1 Jun. 4, 2020

(30) Foreign Application Priority Data

Dec. 3, 2018 (KR) .................. 10-2018-0153769

(51) Int. Cl.
| | |
|---|---|
| *B60L 53/62* | (2019.01) |
| *B60L 53/66* | (2019.01) |
| *B60L 7/10* | (2006.01) |
| *B60L 58/12* | (2019.01) |
| *B60K 6/28* | (2007.10) |

(52) U.S. Cl.
CPC ............ *B60L 53/62* (2019.02); *B60L 7/10* (2013.01); *B60L 53/665* (2019.02); *B60L 58/12* (2019.02); *B60K 6/28* (2013.01); *B60Y 2200/92* (2013.01); *B60Y 2300/91* (2013.01)

(58) Field of Classification Search
CPC .......... B60L 53/62; B60L 53/665; B60L 7/10; B60L 58/12
See application file for complete search history.

(56) References Cited

U.S. PATENT DOCUMENTS

| | | | |
|---|---|---|---|
| 2013/0015860 A1* | 1/2013 | Crombez | G01R 31/36 324/433 |
| 2015/0039391 A1* | 2/2015 | Hershkovitz | G06Q 50/30 705/7.31 |
| 2015/0188324 A1* | 7/2015 | Nicholson | H02J 7/007188 320/107 |

* cited by examiner

*Primary Examiner* — David V Henze-Gongola
(74) *Attorney, Agent, or Firm* — Morgan, Lewis & Bockius LLP

(57) ABSTRACT

A charging control method of an eco-friendly vehicle for effectively determining an amount of charge of a battery for supplying power to a driving electric motor includes acquiring charging base information, determining a charging range depending on at least one of an upper charging limit or a lower charging limit using the acquired charging base information, and determining a target amount of charge within the determined charging range, wherein the determining of the charging range includes determining the upper charging limit based on an available charging time, and determining the lower charging limit based on a predicted remaining driving distance.

18 Claims, 7 Drawing Sheets

ECO-FRIENDLY VEHICLE AND CHARGING CONTROL METHOD THEREFOR

This application claims the benefit of priority to Korean Patent Application No. 10-2018-0153769, filed on Dec. 3, 2018 in the Korean Intellectual Property Office, which is hereby incorporated by reference.

TECHNICAL FIELD

The present disclosure relates to an eco-friendly vehicle and a charging control method therefor, for effectively determining an amount of charge of a battery for supplying power to a driving electric motor.

BACKGROUND

Recently, as interest in an environment increases, there have been many researches on a hybrid electric vehicle (HEV) using an electric motor as a driving source or an electric vehicle (EV).

In general, a hybrid electric vehicle (HEV) refers to a vehicle that uses two power sources that mainly include an engine and an electric motor. An HEV has excellent fuel efficiency and engine performance compared with a vehicle including only an internal combustion engine and is also advantageous for lowering emissions and, thus, has been actively developed recently. In particular, an HEV for charging a battery with external power via plug instead of engine power or regenerative brake is referred to as a plug-in hybrid electric vehicle (PHEV).

In the case of an EV, it is not possible to autonomously generate electricity except for regenerative brake unlike an HEV and, thus, charging using external power is required. A general driver selects one of broadly two charging strategies and, in this case, according to one charging strategy, maximum charging is attempted within permitted spare time and, according to the other charging strategy, charging is attempted by only a required amount of charge. However, the driver has a difficulty in determining the required amount of charge due to limited information and, when maximum charging is attempted within permitted spare time, the driver has a difficult to predict charging costs, which will be described with reference to FIG. 1.

FIG. 1 is a diagram for explanation of a charging environment of a general eco-friendly vehicle.

Referring to FIG. 1, when charging is required due to degradation in a battery state of charge (SOC), even if there is a mainly used charging station 30, a driver of an eco-friendly vehicle 10 that is chargeable through external power may use a charging station 20 around a current position. However, the driver needs to determine an amount of charge in consideration of fuel efficiency indicating a driving distance based on battery power consumption, but it is difficult to determine driving energy, which needs to be ensured to next charging, based on only information provided through a charger of each of the charging stations 20 and 30. In addition, charging cost per unit energy is different for each of the charging stations 20 and 30 and, thus, there is a problem in that it is difficult to recognize a difference between charging costs even if a target amount of charge is determined.

SUMMARY

Accordingly, the present disclosure is directed to an eco-friendly vehicle and a charging control method therefor that substantially obviates one or more problems due to limitations and disadvantages of the related art.

An object of the present disclosure is to provide an eco-friendly vehicle and a charging control method therefor, for more effective charging through external power.

In particular, the present disclosure is to provide an eco-friendly vehicle and a charging control method therefor, for providing information for selecting an optimum charging strategy by a driver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a charging control method of an eco-friendly vehicle includes acquiring charging base information, determining a charging range depending on at least one of an upper charging limit or a lower charging limit using the acquired charging base information, and determining a target amount of charge within the determined charging range, wherein the determining of the charging range includes determining the upper charging limit based on an available charging time, and determining the lower charging limit based on a predicted remaining driving distance.

In another aspect of the present disclosure, an eco-friendly vehicle includes a charging controller configured to acquire charging base information, and including a processor configured to determine a charging range depending on at least one of an upper charging limit or a lower charging limit using the acquired charging base information and to determine a target amount of charge within the determined charging range, and a charger configured to charge a battery using external power to satisfy the determined target amount of charge, wherein the processor is further configured to determine the upper charging limit based on an available charging time, and to determine the lower charging limit based on a predicted remaining driving distance.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

Figure 1:
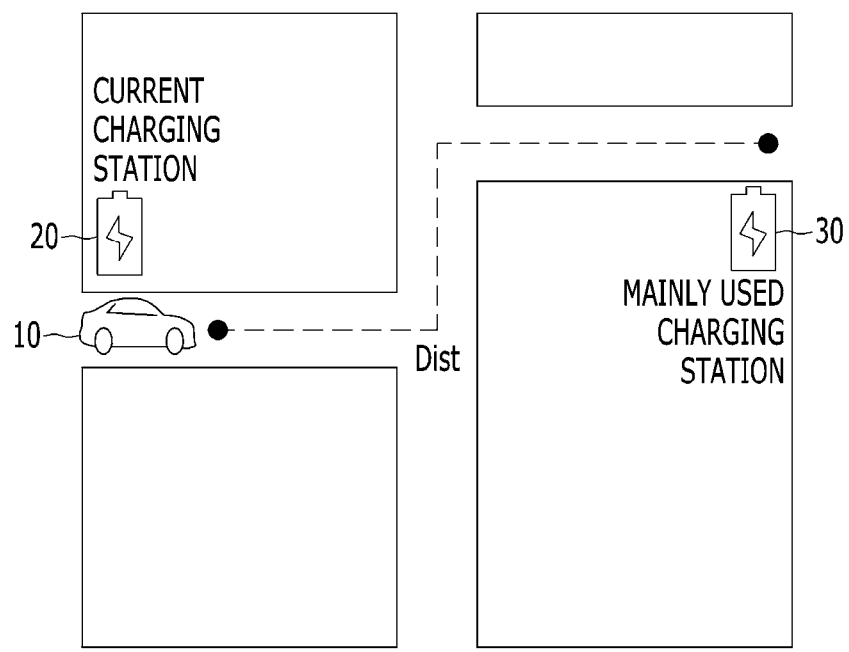
FIG. 1 is a diagram for explanation of a charging environment of a general eco-friendly vehicle.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

DETAILED DESCRIPTION

Exemplary embodiments of the present disclosure are described in detail so as for those of ordinary skill in the art to easily implement with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

In addition, when a certain part "includes" a certain component, this indicates that the part may further include another component instead of excluding another component unless there is no different disclosure. The same reference numbers will be used throughout the drawings and the specification to refer to the same parts.

According to exemplary embodiments of the present disclosure, a charging range depending on at least one of an upper charging limit and a lower charging limit may be determined based on various pieces of charging related information, and information on a target amount of charge determined in consideration of a charging environment within the determined charging range may be provided to a driver.

Figure 2:
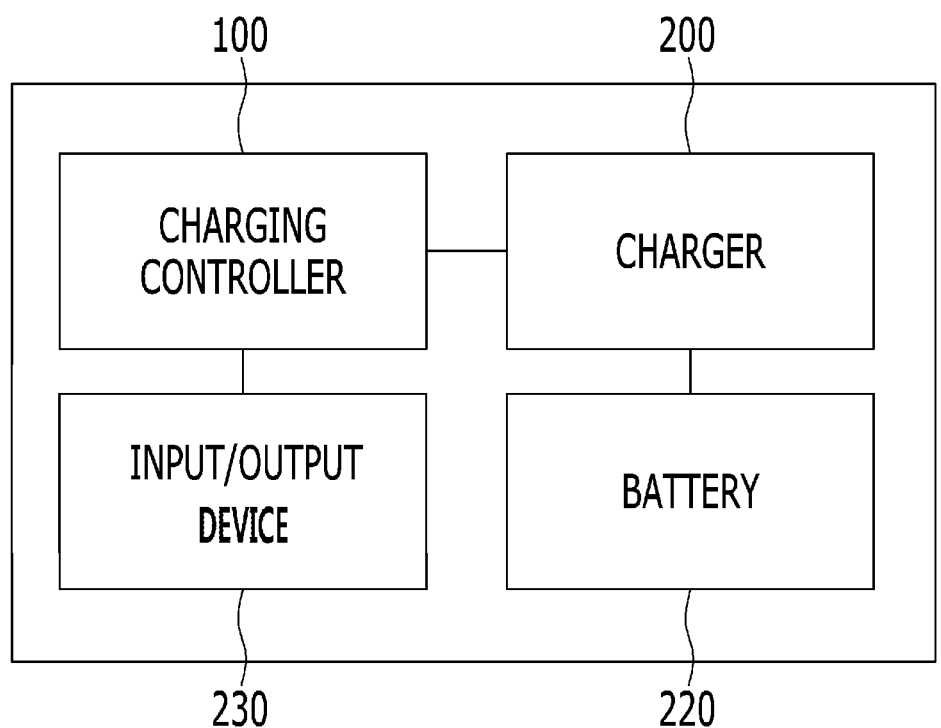
FIG. 2 is a block diagram showing an example of the configuration of an eco-friendly vehicle according to an exemplary embodiment of the present disclosure.

First, the configuration of a vehicle applicable to an exemplary embodiment of the present disclosure will be described with reference to FIG. 2. FIG. 2 is a block diagram showing an example of the configuration of an eco-friendly vehicle according to an exemplary embodiment of the present disclosure.

The eco-friendly vehicle according to an exemplary embodiment of the present disclosure may include a charging controller 100 for determining an amount of charge, a charger 210 for receiving power through a plug from an external charging device and charging a battery 220 with the power, the battery 220 for supplying power to a driving motor, and an input/output device 230 for providing information required to determine an appropriate amount of charge by the charging controller 100 and user input to the charging controller and for outputting information on the amount of charge determined by the charging controller 100.

The charging controller 100 may determine the charging range depending on at least one of the lower charging limit and the upper charging limit based on a driving history of a driver and an available charging time given to the driver, and may determine an optimum amount of charge based on the past driving history and the current charging cost within the determined charging range.

To this end, the charging controller 100 may use, as input information, driving history information, an available charging time corresponding to a remaining time up to departure from a current charging place, a charging cost of the current charging place, a charging cost and an amount of charge of the past charging place, and driver input for correcting the amount of charge. At least some of the input information may be acquired from the input/output device 230 or information installed in the charging controller 100 may be used.

For example, the available charging time and the driver input for correcting the amount of charge may be input through a manipulation system included in the input/output device 230, such as a touchscreen, a key button, or a dial. The driving history information may include information on the past driving path, the length of a driving path, a distance between charging places, a current destination, and the like, and at least some of the corresponding information may be acquired from a navigation system or a telematics unit included in the input/output device 230 or may be stored in a memory itself included in the charging controller 100.

The charger 210 may perform slow charge or quick charge according to determination of the charging method and the amount of charge of the charging controller 100. Slow charge may be embodied in the form of an on-board charger (OBC) and quick charge may be embodied in the form of power line communication, but the present disclosure is not limited thereto.

The input/output device 230 may include at least one of a cluster, a navigation system, an integrated manipulation system, and a telematics unit.

Figure 3:
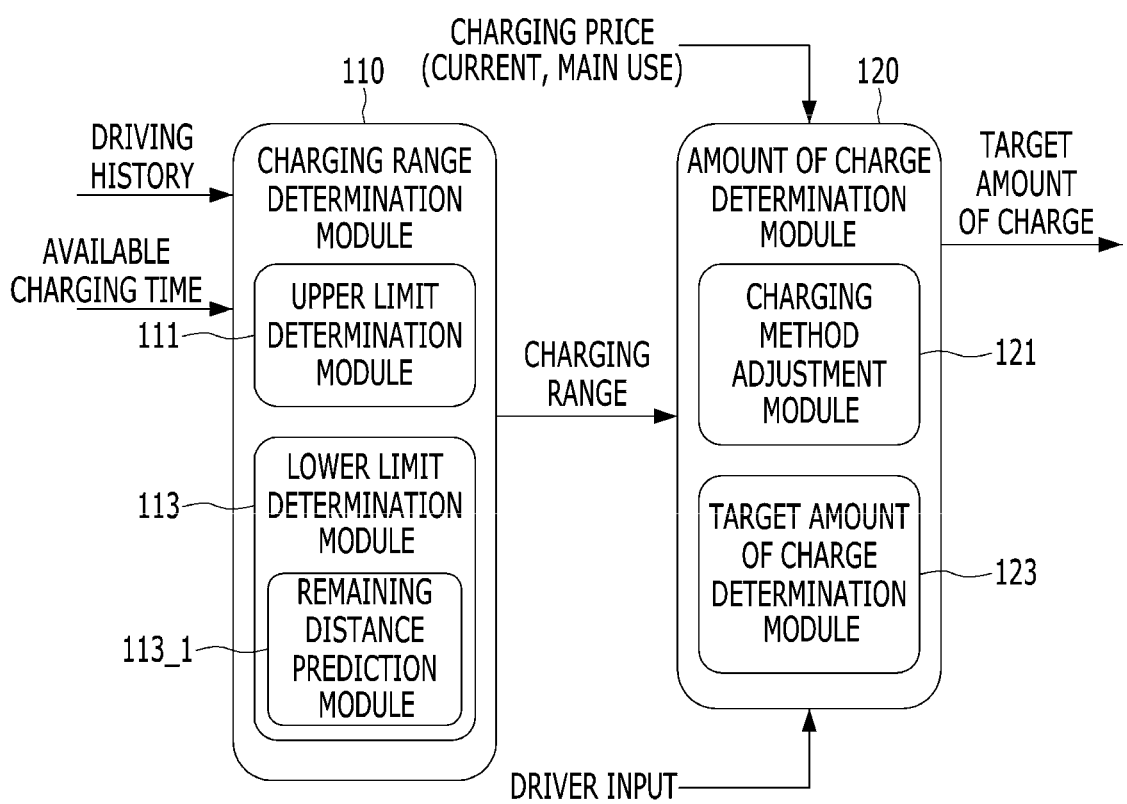
FIG. 3 is a block diagram showing an example of the configuration of a charging controller of an eco-friendly vehicle according to an exemplary embodiment of the present disclosure.

Hereinafter, the configuration and function of the charging controller 100 will be described in more detail with reference to FIG. 3. FIG. 3 is a block diagram showing an example of the configuration of a charging controller 100 of an eco-friendly vehicle according to an exemplary embodiment of the present disclosure.

Referring to FIG. 3, the charging controller 100 according to an exemplary embodiment of the present disclosure may include a processor. The processor has an associated non-transitory memory storing software instructions which, when executed by the processor, provides the functionalities of a charging range determination module 110 and an charge amount determination module 120.

The charging range determination module 110 may determine a charging range depending on at least one of the upper charging limit and the lower charging limit and, to this end, may include an upper limit determination module 111 for determining the upper charging limit and a lower limit determination module 113. Here, the lower limit determination module 113 may include a remaining distance prediction module 113_1 for predicting a predicted remaining distance to next charge. For example, the charging range may be defined as the range between the upper charging limit and the lower charging limit or may be determined to be equal to or greater than the lower charging limit.

The charge amount determination module 120 may determine the most appropriate amount of charge as a target amount of charge in the current charging station within the charging range determined by the charging range determination module 110. To this end, the charge amount determination module 120 may include a charging method adjustment module 121 and a target charge amount determination module 123.

Hereinafter, an operation of each component will be described in detail.

First, an operation of the charging range determination module 110 will be described.

The upper limit determination module 111 may determine, as the upper charging limit, the amount of charge when maximum charging is performed, based on the available charging time. Here, the available charging time may be based on driver input and may be any one of a time taken up to full charge from a current SOC without input or an average charging time based on the past history. In some embodiments, the upper charging limit determined using the aforementioned method may be corrected based on a regenerative brake amount. For example, when the upper charging limit corresponds to full charge, the upper charging limit may be adjusted to be lowered in consideration of an occurrence ratio of regenerative brake limitations (a number of times that regenerative braking is limited for the last N number of times of full charging) due to a high SOC. As another example of correcting the upper charging limit based on a regenerative brake amount, when a downhill road is expected to be present on a driving path after charging, the upper charging limit may be adjusted not to exceed an SOC obtained by subtracting a predicted regenerative brake amount on the downhill road from an SOC corresponding to full charging.

Then, the lower limit determination module 113 may determine the lower charging limit by summing energy required to drive over the remaining driving distance (e.g., distance until charge (DUC)) to next charge and a preset minimum SOC. For example, the lower limit determination module 113 may determine the lower charging limit like "f(remaining driving distance)+lower SOC limit". Here, "f(remaining driving distance)" may be an equation for determining a required SOC based on the remaining driving distance and, for example, may be configured in the form of "remaining driving distance*fuel efficiency [%/km]," but the present disclosure is not limited thereto. In addition, the preset minimum SOC may be an SOC that is set for protection and SOC balancing of the battery 220 with a high voltage, in the case of a plug-in hybrid electric vehicle (PHEV), the preset minimum SOC may be an SOC as a reference for transition into a charge sustaining (CS) mode, and in the case of a hybrid electric vehicle (HEV), the preset minimum SOC may be an SOC as a reference for compulsory transition into an HEV mode. In addition, in the case of an electric vehicle (EV), the preset minimum SOC may be a lower SOC limit for prevention of over discharge.

The remaining distance prediction module 113_1 may determine a remaining distance, which is a greater value between 1) a distance obtained by subtracting a today driving distance from a distance that satisfies a preset probability in probability distribution of a daily driving distance, and 2) a distance to a mainly used charging station from a current charging station.

Here, the daily driving distance may be an actual driving distance or DUC and the probability distribution of a daily driving distance may be generated based on data of the week and a road type. This is because it is general that the probability distribution of a daily driving distance is identified depending on a road type and a ratio of a driving road is identified depending on a day of the week, which will be described with reference to FIG. 4.

Figure 4:
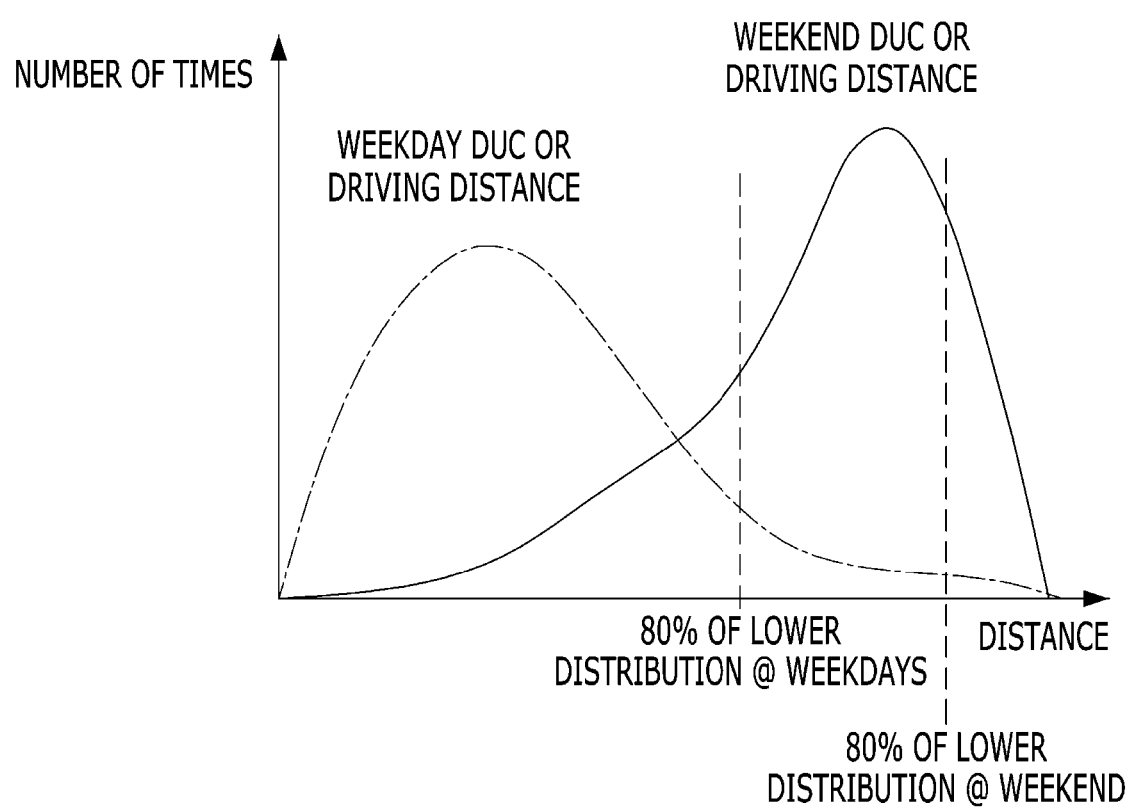
FIG. 4 is a diagram showing an example of driving distance distribution for each timing according to an exemplary embodiment of the present disclosure.

FIG. 4 is a diagram showing an example of driving distance distribution for each timing according to an exemplary embodiment of the present disclosure.

Referring to FIG. 4, since vehicles mostly drive downtown for commuting on weekdays, a driving distance or a DUC is comparatively short and, since vehicles frequently drive on a motorway such as a highway for a picnic or a leisure life on weekends, a driving distance or a DUC is long compared to weekdays. When a probability set in the remaining distance prediction module 113_1 is 80%, a distance that satisfies 80% of lower distribution in a plot corresponding to today among plots of weekdays or weekend may be determined as a remaining driving distance. Such plots may be generated based on information set for each country or region based on big data or may be generated based on a driving history of a subject vehicle. For example, when a cumulative driving distance is equal to or less than a predetermined distance, a plot set based on big data may be used, and when the cumulative driving distance is greater than the predetermined distance, a plot set based on a driving distance of a subject vehicle may be used, but the present disclosure is not limited thereto.

First, an operation of the charge amount determination module 120 will be described.

The charge amount determination module 120 may set any one of a default value set by a driver, a previous used value, or slow charge as a basic charging method. However, when any one of the following conditions is satisfied, the charging method adjustment module 121 may change and guide a charging method.

The charging method adjustment module 121 may change a charging method to quick charge from slow charge 1) when the basic charging method is slow charge, if a predicted amount of charge during an available charging time does not satisfies the lower charging limit. When the basic charging method is quick charge, the charging method adjustment module 121 may change a charging method to slow chart from quick charge when the predicted amount of charge during the available charging time is greater than the upper charging limit.

Figure 5:
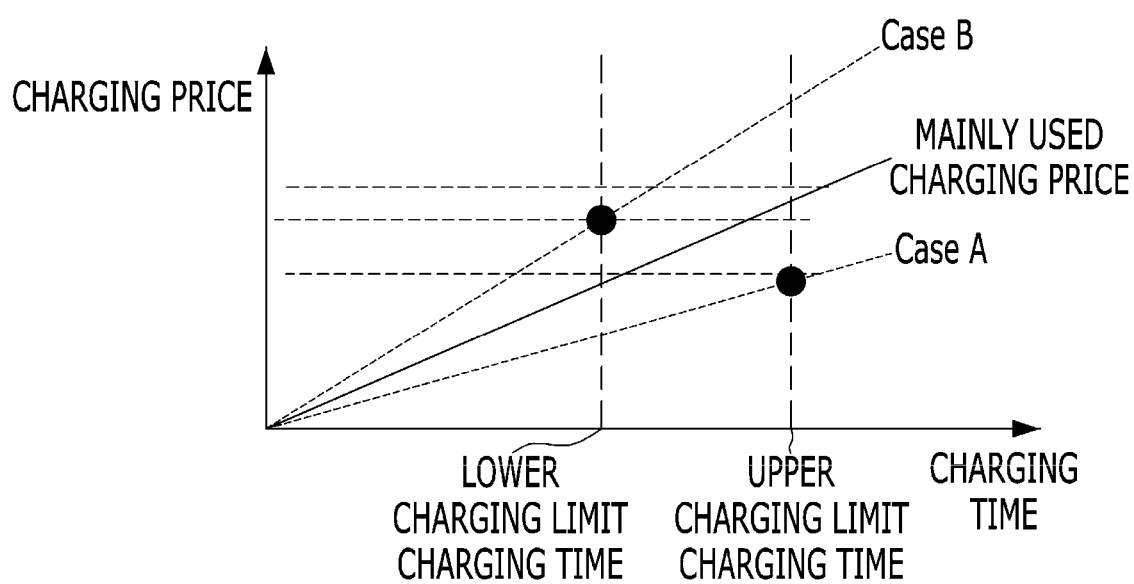
FIG. 5 is a diagram showing an example in which a current charging cost and a mainly used charging cost are different.

The target charge amount determination module 123 may compare a current charging cost and a mainly used charging cost based on a past charging history to determine a target amount of charge, which will be described with reference to FIG. 5. FIG. 5 is a diagram showing an example in which the current charging cost and the mainly used charging cost are different.

FIG. 5 shows a plot corresponding to CASE A in which the current charging cost is lower than the mainly used charging cost and a plot corresponding to CASE B in which the current charging cost is higher than the mainly used charging cost.

Referring to FIG. 5, when the current charging cost is lower than the mainly used charging cost (i.e., CASE A), the target charge amount determination module 123 may determine the upper charging limit as the target amount of charge. On the other hand, when the current charging cost is higher than the mainly used charging cost (i.e., CASE B), the target charge amount determination module 123 may determine the lower charging limit as the target amount of charge.

The determined target amount of charge may be output through an output device of the input/output device 230. For example, the determined target amount of charge may be output in the form of visual information through a display of a cluster, a navigation system, or an audio/video/navigation (AVN) system. As another example, the determined target amount of charge may also be output with the upper charging limit and lower charging limit information, and additional information for facilitating selection of a driver may be further provided, which will be described with reference to FIG. 6.

Figure 6:
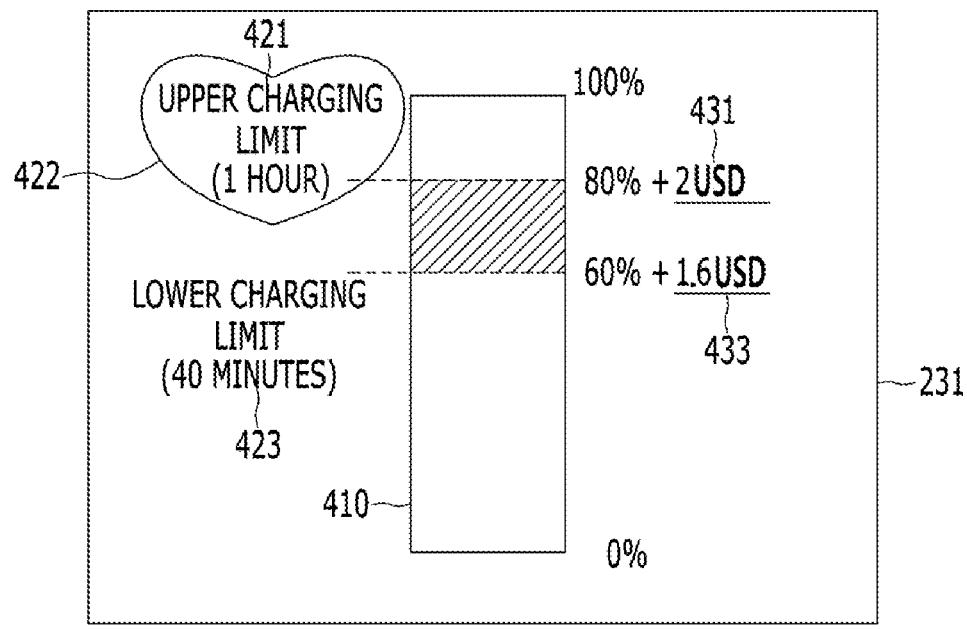
FIG. 6 is a diagram showing an example of an output form of charging information according to an exemplary embodiment of the present disclosure.

FIG. 6 is a diagram showing an example of an output form of charging information according to an exemplary embodiment of the present disclosure.

Referring to FIG. 6, a battery gage 410 may be displayed on a display 231 of a cluster, a navigation system, or an audio/video/navigation (AVN) system. The battery gage 410 may indicate each of upper charging limit information 421 and lower charging limit information 423 which may each include a required charging time. The lastly determined target amount of charge may be displayed in the form of an indicator 422 that is configured in a preset form around the upper charging limit information or the lower charging limit. In the case of FIG. 6, the indicator 422 may be displayed around the upper charging limit information 421, and a driver may recognize an SOC of 80% that is the upper charging limit as an optimum amount of charge. In addition, difference information 431 and 433 for comparison of charging cost between the current charging station and the mainly used charging station may also be output. For example, when charging is performed at the current charging station up to the upper charging limit, the driver may recognize that charging is more expensive than in the case of the mainly used charging station by $2 and, when charging is performed up to the lower charging limit, the driver may recognize that charging is more expensive than in the case of the mainly used charging station by $1.60.

The target amount of charge according to the present embodiment may be corrected based on a driver command input or a preset reference. In detail, the target charge amount determination module 123 may correct and output at least one of a charging cost, an SOC, or a charging time, which correspond to the target amount of charge determined by a correction command from a driver or by a preset minimum unit value of the SOC of the battery 220, which is preset in a setting. This will be described in FIG. 7.

Figure 7:
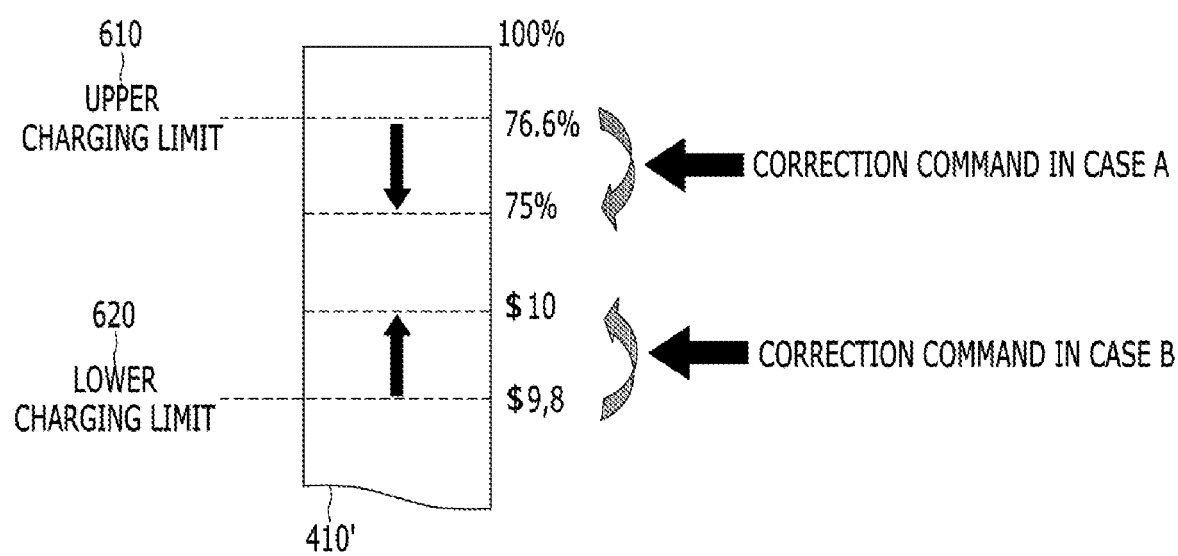
FIG. 7 is a diagram showing a correction form of charging information based on driver selection according to an exemplary embodiment of the present disclosure.

FIG. 7 is a diagram showing a correction form of charging information based on driver selection according to an exemplary embodiment of the present disclosure. In FIG. 7, the two cases CASE A and CASE B shown in FIG. 5 are assumed.

Referring to FIG. 7, in CASE A, the upper charging limit may be determined as the target amount of charge, and an SOC value 610 that is 76.6% corresponding to the upper charging limit may be a target amount of charge information displayed around a battery gage 410'. In this case, when a preset minimum unit value of the SOC is a unit of 5%, the last target amount of charge, i.e., 76.6%, may be corrected to 75% according to a driver correction command input or a setting.

On the other hand, in CASE B, the lower charging limit may be determined as the target amount of charge, and $9.8 that is a charging cost 620 for charging up to the lower charging limit may be a target amount of charge information displayed around the battery gage 410'. In this case, when indication preset minimum unit value of the charging cost is a unit of $1, the last target amount of charge, i.e., $9.8, may be rounded off to $10 according to the driver correction command input or the setting.

Figure 8:
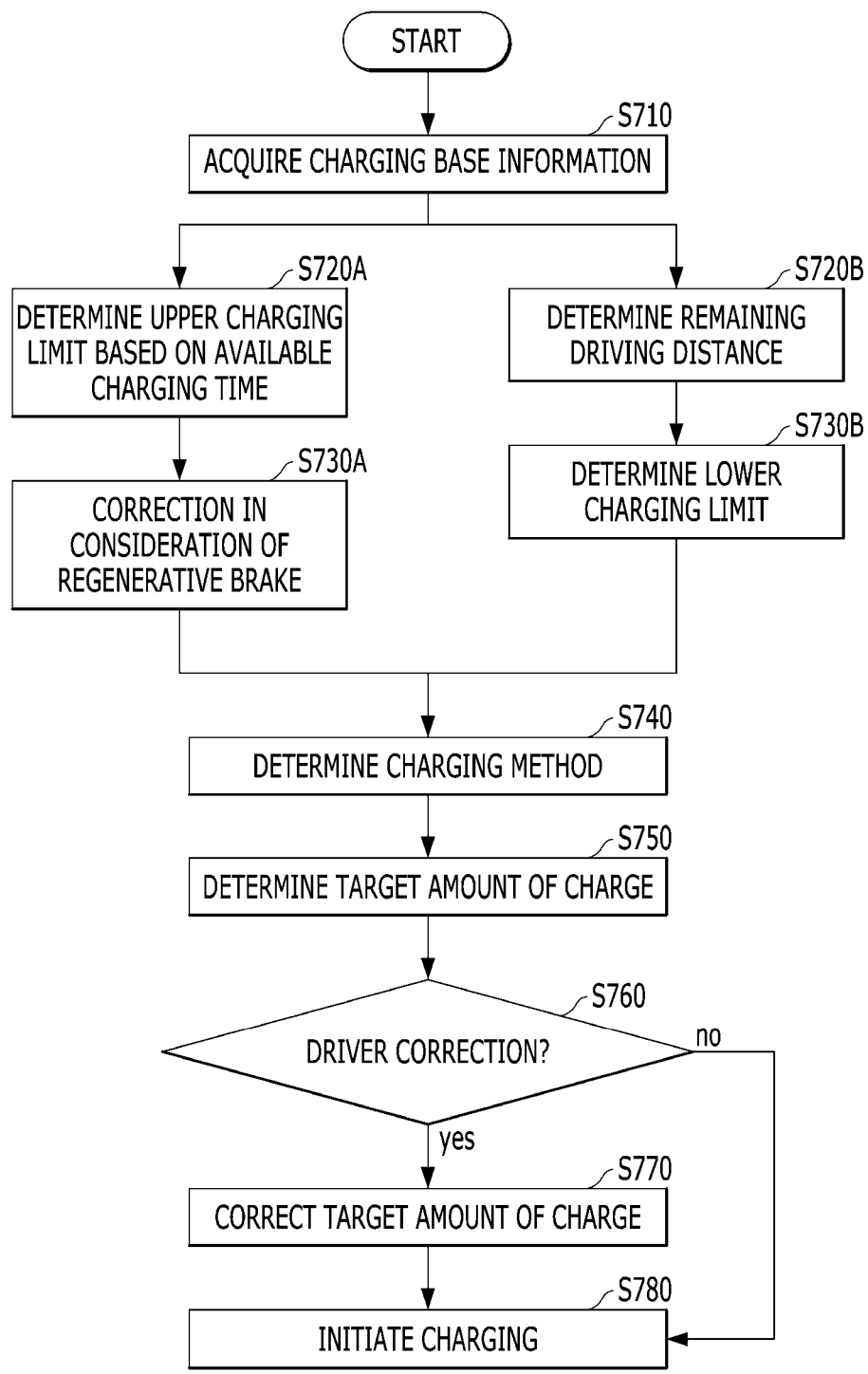
FIG. 8 is a flowchart showing an example of a charging control procedure according to an exemplary embodiment of the present disclosure.

A procedure of determining an amount of charge according to the embodiment described thus far is shown as a flowchart of FIG. 8. FIG. 8 is a flowchart showing an example of a charging control procedure according to an exemplary embodiment of the present disclosure.

Referring to FIG. 8, first, charging base information that is used as a reference for determination of an optimum target amount of charge may be acquired (S710). Here, the charging base information may include the past driving history, the past charging history, a charging cost of the current charging station, or an available charging time.

When the charging base information is acquired, the charging range determination unit 110 may determine a charging range, i.e., upper charging limits (S720A and S730A) and lower charging limits (S720B and S730B).

In detail, the upper limit determination module 111 may determine the upper charging limit based on the available charging time (S720A) and may also correct the upper charging limit determined in consideration of regenerative brake (S730A). A detailed method of initially determining and correcting the upper charging limit is the same as the above description given with reference to FIG. 3 and, thus, a repeated description thereof is omitted here.

The remaining distance prediction module 113_1 of the lower limit determination module 113 may determine a predicted remaining distance (S720B) and may add a preset minimum SOC to the predicted remaining distance to determine the lower charging limit (S730B). Here, a method of determining the predicted remaining distance is the same as the above description given with reference to FIG. 4 and, thus, a repeated description thereof is omitted here.

When the charging range is determined, the charging method adjustment module 121 of the charge amount determination module 120 may compare the available charging time and the charging range and may comply with a default setting or may convert the default setting into other setting (e.g., switch between slow charge and quick charge) (S740).

Then, the target charge amount determination module 123 may compare a charging cost of the current charging station and a charging cost of the mainly used charging station based on the past charging history to determine the target amount of charge as the upper charging limit or the lower charging limit (S750). In this case, the determined target amount of charge may be displayed in a predetermined form through an output device of the input/output device 230.

When there is a correction command of the driver in a state in which the target amount of charge is determined (S760), the target amount of charge may be corrected to satisfy a preset minimum unit value (S770). A detailed correction form is the same as the above description given with reference to FIG. 7 and, thus, a repeated description thereof is omitted here.

When the last target amount of charge is determined, charging may be begun to satisfy the determined amount of charge (S780). To this end, the charging controller 100 may control the charger 210 until the amount of charge determined using the determined charging method is satisfied.

The hybrid vehicle configured as described above related to at least one of the present disclosure may be more effectively charged through external power.

In particular, according to the present disclosure, information for enabling a driver to select a charging strategy may be provided to guide the driver to select an optimum amount of charge.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the inventions. Thus, it is intended that the present disclosure cover the modifications and variations of this invention provided they come within the scope of the appended claims and their equivalents.

What is claimed is:

1. A charging control method of an eco-friendly vehicle, the method comprising:
    acquiring charging base information;
    determining a charging range of a battery depending on an upper charging limit and a lower charging limit using the acquired charging base information; and
    determining a target amount of charge between the determined charging range,
    wherein the determining of the charging range includes:
        determining the upper charging limit based on an available charging time; and
        determining the lower charging limit based on a predicted remaining driving distance, and
    wherein the predicted remaining driving distance is determined to be a greater value between a first distance obtained by subtracting a today driving distance from a distance that satisfies a preset probability in probability distribution of a daily driving distance and a second distance to a relatively more used charging station from a current charging station.

2. The method of claim 1, wherein the charging base information includes at least one of past driving history, past charging history, a charging cost of a current charging station, or an available charging time.

3. The method of claim 1, wherein the determining of the upper charging limit includes adjusting the upper charging limit based on the available charging time in consideration of regenerative braking.

4. The method of claim 3, wherein the adjusting of the upper charging limit is performed in consideration of at least one of an occurrence ratio of limiting the regenerative braking after full charging or a regenerative braking amount of a downhill road expected to be present on a driving path after charging.

5. The method of claim 1, wherein the lower charging limit is determined by adding energy required to drive the predicted remaining driving distance to a preset minimum amount of charge.

6. The method of claim 1, wherein the determining of the target amount of charge includes determining the upper charging limit or the lower charging limit as the target amount of charge.

7. The method of claim 6, wherein the determining of the target amount of charge includes:
    determining the lower charging limit as the target amount of charge when a current charging station cost is more expensive than a charging cost based on a past charging history; and
    determining the upper charging limit as the target amount of charge when the current charging station cost is cheaper than the charging cost based on the past charging history.

8. The method of claim 1, further comprising determining a charging method based on the charging range,
    wherein the determining of the charging method includes changing a current charging method to another charging method when an amount of charge by the current charging method does not satisfy the lower charging limit during the available charging time or the amount of charge by the current charging method is greater than the upper charging limit during the available charging time.

9. The method of claim 1, further comprising correcting the determined target amount of charge to a new target amount of charge according to a preset minimum unit value of an SOC of the battery preset in a setting or by a correction command from a user.

10. A non-transitory computer readable recording medium having recorded thereon a program for executing the method of claim 1.

11. An eco-friendly vehicle comprising:
    a charging controller configured to acquire charging base information, and including a processor configured to determine a charging range depending on an upper charging limit and a lower charging limit using the acquired charging base information and to determine a target amount of charge between the determined charging range; and
    a charger configured to charge a battery using external power to satisfy the determined target amount of charge,
    wherein the processor is further configured to:
        determine the upper charging limit based on an available charging time, and
        determine the lower charging limit based on a predicted remaining driving distance, and
    wherein the processor is further configured to determine the predicted remaining driving distance to be a greater value between a first distance obtained by subtracting a today driving distance from a distance that satisfies a preset probability in probability distribution of a daily driving distance and a second distance to a relatively more used charging station from a current charging station.

12. The eco-friendly vehicle of claim 11, wherein the processor adjusts the upper charging limit based on the available charging time in consideration of regenerative braking.

13. The eco-friendly vehicle of claim 12, wherein the processor adjusts the upper charging limit in consideration of at least one of an occurrence ratio of limiting the regenerative braking after full charging or a regenerative braking amount of a downhill road expected to be present on a driving path after charging.

14. The eco-friendly vehicle of claim 11, wherein the processor adds energy required to drive the predicted remaining driving distance to a preset minimum amount of charge.

15. The eco-friendly vehicle of claim 11, wherein the processor determines the upper charging limit or the lower charging limit as the target amount of charge.

16. The eco-friendly vehicle of claim 15, wherein the processor determines the lower charging limit as the target amount of charge when a current charging station cost is more expensive than a charging cost based on a past charging history, and determines the upper charging limit as the target amount of charge when the current charging station cost is cheaper than the charging cost based on the past charging history.

17. The eco-friendly vehicle of claim 11, wherein the processor corrects the determined target amount of charge to a new target amount of charge according to a preset minimum unit value of an SOC of the battery preset in a setting or by a correction command from a user.

18. The eco-friendly vehicle of claim 11, wherein the processor is further configured to determine a charging method based on the charging range,
wherein the processor changes a current charging method to another charging method when an amount of charge by the current charging method does not satisfy the lower charging limit during the available charging time or the amount of charge by the current charging method is greater than the upper charging limit during the available charging time.

* * * * *